(12) United States Patent
Lin

(10) Patent No.: US 7,042,742 B2
(45) Date of Patent: May 9, 2006

(54) CHARGE-PUMP CIRCUITRY

(75) Inventor: Meng-Jyh Lin, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 142 days.

(21) Appl. No.: 10/709,638

(22) Filed: May 19, 2004

(65) Prior Publication Data

US 2005/0135125 A1 Jun. 23, 2005

(30) Foreign Application Priority Data

Dec. 22, 2003 (TW) .............................. 92136375 A

(51) Int. Cl.
*H02M 3/07* (2006.01)

(52) U.S. Cl. ...................................................... 363/59

(58) Field of Classification Search .................. 363/59, 363/60
See application file for complete search history.

(56) References Cited

U.S. PATENT DOCUMENTS

| | | | | |
|---|---|---|---|---|
| 5,493,543 A | * | 2/1996 | Kamens ...................... | 368/255 |
| 5,680,300 A | * | 10/1997 | Szepesi et al. ................ | 363/59 |
| 6,084,789 A | * | 7/2000 | Van Lieshout ............... | 363/60 |
| 6,169,673 B1 | * | 1/2001 | McIntyre et al. ............. | 363/59 |
| 6,654,263 B1 | * | 11/2003 | Kurotsu ....................... | 363/60 |
| 6,828,851 B1 | * | 12/2004 | Lee et al. .................... | 327/537 |
| 6,834,001 B1 | * | 12/2004 | Myono ......................... | 363/60 |
| 6,920,055 B1 | * | 7/2005 | Zeng et al. ................... | 363/59 |
| 6,927,441 B1 | * | 8/2005 | Pappalardo et al. ........ | 257/299 |

\* cited by examiner

*Primary Examiner*—Jeffrey Sterrett
(74) *Attorney, Agent, or Firm*—Jiang Chyun IP Office

(57) ABSTRACT

A charge-pump circuitry which receives an external voltage source to generate a target voltage is provided. The charge-pump circuitry comprises a voltage multiplier module and a voltage difference generating circuitry. Wherein, a first input terminal of the voltage multiplier module receives the external voltage source, and the voltage multiplier module generates a multiplied-voltage according to the external voltage source. The voltage potential of the multiplied-voltage is a predetermined times of the voltage potential of the external voltage source. The voltage difference generating circuitry generates a correcting voltage which is input to a second input terminal of the voltage multiplier module. The voltage potential of the correcting voltage is the potential difference between the target voltage and the multiplied-voltage.

14 Claims, 3 Drawing Sheets

US 7,042,742 B2

CHARGE-PUMP CIRCUITRY

CROSS REFERENCE TO RELATED APPLICATIONS

This application claims the priority benefit of Taiwan application serial no. 92136375, filed Dec. 22, 2003.

BACKGROUND OF INVENTION

1. Field of the Invention

The present invention relates to a charge-pump circuitry, and more particularly, to a charge-pump circuitry which directly outputs a target voltage.

2. Description of the Related Art

It is common that a system comprises multiple ICs which provide different functions, and some IC can operate normally only under a voltage potential higher than the external voltage source provided to the system. Therefore, it is common that the system uses a charge-pump circuitry to pull up the voltage potential of the external voltage source to a voltage potential required by these special ICs for supporting the normal operation of these ICs.

FIG. 1A is a schematic circuit diagram of a conventional regulated charge-pump circuitry. Referring to FIG. 1A, the conventional regulated charge-pump circuitry is composed of a voltage multiplier module 100 and an operational amplifier 109. The voltage multiplier module 100 comprises dual port switches 101, 103, 105, 107 and capacitors 111, 113. Wherein, two terminals of the capacitor 111 electrically couple to the dual port switch 101 and the dual port switch 103, respectively. One terminal of the dual port switch 101, which is disposed opposite to the capacitor 111, receives an external voltage source VDD, and one terminal of the dual port switch 103 opposite to the capacitor 111 is grounded. One terminal of the dual port switch 105 electrically couples to the capacitor 111 and the dual port switch 101, and the other terminal of the dual port switch 105 electrically couples to the capacitor 113 and a voltage regulator 110 which is composed of the operational amplifier 109. One terminal of the dual port switch 107 electrically couples to the capacitor 111 and the dual port switch 103, and the other terminal of the dual port switch 107 receives the external voltage source VDD.

Referring to FIG. 1A, the "turn-on" cycles of the dual port switch 101, 103 are the same and not overlapped with the "turn-on" cycles of the dual port switch 105, 107. In addition, the "turn-on" cycle of the dual port switch 107 leads the "turn-on" cycle of the dual port switch 105 a certain period of time. When the dual port switches 101, 103 are turned on, the capacitor 111 is being charged to a potential of the external voltage source VDD. After the charge of the capacitor 111 is completed, the dual port switches 101, 103 are turned off. Then, the dual port switch 107 is turned on first, and the dual port switch 105 is turned on subsequently. Meanwhile, the voltage potential on a positive voltage terminal 13 of the capacitor 111 is two times of the potential of the external voltage source VDD, and the voltage is entirely charged to the capacitor 113.

Referring to FIG. 1A, an example is used for explanation hereinafter. It is assumed that the external voltage source VDD is 4V, and finally the target voltage output from the output terminal $V_{out}$ is 5V. The voltage multiplier module in the conventional regulated charge-pump circuitry of FIG. 1A pulls up the external voltage source VDD from 4V to 8V first, and sends the pulled-up voltage to the voltage regulator 110, and a 5V voltage is output from the output terminal $V_{out}$ via the voltage regulator 110. Therefore, in theory, the optimum efficiency of the conventional regulated charge-pump circuitry is 62.5% (i.e. 5V/8V=0.625). In other words, only 5V out of 8V is used, and the rest 3V is wasted.

FIG. 1B is a schematic circuit diagram of another conventional regulated charge-pump circuitry. Referring to the circuit diagram in FIG. 1B, a comparator 121 is used to replace the operational amplifier 109 in FIG. 1A. This conventional regulated charge-pump circuitry is characterized in that a control signal is output from an output terminal of the comparator 121 for controlling the dual port switches 101, 103, 105, 107. Its operating principle is similar to the conventional regulated charge-pump circuitry in FIG. 1A. More particularly, when the capacitor 111 has been charged to the voltage potential of the external voltage source VDD, the comparator 121 controls the dual port switches 101, 103 to turn off, and when the voltage potential on the output terminal $V_{out}$ reaches the target voltage, the comparator 121 sends out a control signal to control the dual port switches 105, 107 to turn off. Thus, in theory, no power is wasted on the output terminal. However, when all dual port switches 101, 103, 105, 107 are turned off, there may be still some charges remaining inside the capacitor 111. Since these charges are totally isolated in the capacitor 111 and cannot not be discharged even when time passed by, a power loss is generated accordingly.

In summary, the conventional regulated charge-pump circuitry uses a voltage multiplier module to pull up an external voltage source first, and the pulled-up voltage is then sent to a voltage regulator for generating a target voltage.

SUMMARY OF INVENTION

Therefore, it is an object of the present invention to provide a charge-pump circuitry, which generates a target voltage directly from its output terminal without passing through a voltage regulator.

In order to achieve the object mentioned above and others, a charge-pump circuitry which receives an external voltage source to generate a target voltage is provided by the present invention. The charge-pump circuitry of the present invention comprises a voltage multiplier module, a voltage difference generating circuitry, and a first capacitor. Wherein, the voltage multiplier module comprises an input terminal and an output terminal, and its first input terminal receives an external voltage source. The voltage multiplier module generates a multiplied-voltage according to the external voltage source, and the voltage potential of the multiplied-voltage is a predetermined times of the voltage potential of the external voltage source. In addition, the voltage difference generating circuitry generates a correcting voltage, which is sent to a terminal on the output terminal side of the voltage multiplier module. The voltage potential of the correcting voltage is the potential difference between the target voltage and the multiplied-voltage. One terminal of the first capacitor mentioned above electrically couples to an output terminal of the voltage multiplier module, and the other terminal of the first capacitor is grounded. The voltage multiplier module adds a voltage potential of the multiplied-voltage to a voltage potential of the correcting voltage, and sends a voltage of the summation result to the first capacitor from its output terminal.

The voltage difference generating circuitry comprises an operational amplifier, a first resistor, a second resistor, and a third resistor. The operational amplifier comprises a negative signal input terminal, a positive signal input terminal, and an output terminal. Wherein, its positive signal input terminal receives a reference voltage, and its output terminal electrically couples to a second input terminal of the voltage multiplier module. One terminal of the first resistor electrically couples to the negative signal input terminal of the operational amplifier, and the other terminal of the first resistor receives an external voltage source. Similarly, one terminal of the second resistor electrically couples to the negative signal input terminal of the operational amplifier, and the other terminal of the second resistor is grounded. In addition, one terminal of the third resistor electrically couples to the negative signal input terminal of the operational amplifier, and the other terminal of the third resistor electrically couples to the output terminal of the operational amplifier.

In addition, the voltage multiplier module comprises a first switch circuit, a second switch circuit, and a second capacitor. Wherein, the first switch circuit comprises a $1^{st}$ terminal, a $2^{nd}$ terminal, a $3^{rd}$ terminal, and a $4^{th}$ terminal. The $1^{st}$ terminal receives the external voltage source, and the $2^{nd}$ terminal is grounded. One terminal of the second capacitor electrically couples to the $3^{rd}$ terminal of the first switch circuit, and the other terminal electrically couples to the $4^{th}$ terminal of the first switch circuit. Similarly, the second switch circuit comprises a $5^{th}$ terminal, a $6^{th}$ terminal, a $7^{th}$ terminal, and an $8^{th}$ terminal. The $5^{th}$ terminal electrically couples to the $3^{rd}$ terminal of the first switch circuit, the $6^{th}$ terminal electrically couples to the $4^{th}$ terminal of the first switch circuit, and the $7^{th}$ and $8^{th}$ terminals electrically couple to the output terminals of the voltage multiplier module. In summary, the function of the first switch circuit is to determine whether to have the external voltage source pass through to charge the second capacitor. The second switch circuit is used to determine whether to have the target voltage pass through to charge the first capacitor.

A summation of a potential stored by the second capacitor and a potential of the correcting voltage is the voltage potential of the target voltage mentioned above.

The first switch circuit comprises a first dual port switch and a second dual port switch, wherein one terminal of the first dual port switch electrically couples to the $1^{st}$ terminal of the first switch circuit, and the other terminal of the first dual port switch electrically couples to the $3^{rd}$ of the first switch circuit. One terminal of the second dual port switch electrically couples to the $2^{nd}$ terminal of the first switch circuit, and the other terminal of the second dual port switch electrically couples to the $4^{th}$ terminal of the first switch circuit. Therefore, the first and second dual port switches are used to determine whether to have the external voltage source pass through to charge the second capacitor.

Similarly, the second switch circuit comprises a third dual port switch and a fourth dual port switch, wherein one terminal of the third dual port switch electrically couples to the $5^{th}$ terminal of the second switch circuit, and the other terminal of the third dual port switch electrically couples to the $7^{th}$ terminal of the second switch circuit. One terminal of the fourth dual port switch electrically couples to the $6^{th}$ terminal of the second switch circuit, and the other terminal of the fourth dual port switch electrically couples to the $8^{th}$ terminal of the second switch circuit. Therefore, the third and fourth dual port switches are used to determine whether to have the correcting voltage pass through to charge the first capacitor.

Wherein, the "turn-on" and "turn-off" cycles of the first dual port switch and the second dual port switch is referred as a first clock cycle, the "turn-on" and "turn-off" cycles of the third dual port switch is referred as a second clock cycle, and the "turn-on" and "turn-off" cycles of the fourth dual port switch is referred as a third clock cycle. During the duty cycle of the first clock cycle, the second clock cycle, and the third clock cycle, the first dual port switch, the second dual port switch, the third dual port switch, and the fourth dual port switch are all turned on.

The duty cycle of the first clock cycle is not overlapped with the duty cycle of the second clock cycle, and the duty cycle of the first clock cycle is not overlapped with the duty cycle of the third clock cycle, neither. In addition, the duty cycle of the third clock cycle leads the duty cycle of the second clock cycle a certain period of time.

According to another aspect of the present invention, the charge-pump circuitry of the present invention provides a different type of the voltage multiplier module. Wherein, the first switch circuit still comprises a first dual port switch and a second dual port switch. One terminal of the first dual port switch electrically couples to the $1^{st}$ terminal of the first switch circuit, and the other terminal of the first dual port switch electrically couples to the $3^{rd}$ terminal of the first switch circuit. One terminal of the second dual port switch electrically couples to the $2^{nd}$ terminal of the first switch circuit, and the other terminal of the second dual port switch electrically couples to the $6^{th}$ terminal of the first switch circuit. Similarly, the first and second dual port switches are used to determine whether to have the external voltage source pass through to charge the second capacitor.

In addition, the second switch circuit also comprises a third dual port switch and a fourth dual port switch. One terminal of the third dual port switch electrically couples to the $5^{th}$ terminal of the second switch circuit, and the other terminal of the third dual port switch electrically couples to the $7^{th}$ terminal of the second switch circuit. One terminal of the fourth dual port switch electrically couples to the $4^{th}$ terminal of the second switch circuit, and the other terminal of the second dual port switch electrically couples to the $8^{th}$ terminal of the second switch circuit. Similarly, the third and fourth dual port switches are used to determine whether to have the correcting voltage pass through to charge the first capacitor.

Wherein, the "turn-on" and "turn-off" cycles of the first dual port switch and the second dual port switch is referred as a first clock cycle, the "turn-on" and "turn-off" cycles of the third dual port switch is referred as a second clock cycle, and the "turn-on" and "turn-off" cycles of the fourth dual port switch is referred as a third clock cycle. During the duty cycle of the first clock cycle, the second clock cycle, and the third clock cycle, the first dual port switch, the second dual port switch, the third dual port switch, and the fourth dual port switch are all turned on.

The duty cycle of the first clock cycle is not overlapped with the duty cycle of the second clock cycle, and the duty cycle of the first clock cycle is not overlapped with the duty cycle of the third clock cycle, neither. In addition, the duty cycle of the second clock cycle leads the duty cycle of the third clock cycle a certain period of time.

In summary, the charge-pump circuitry of the present invention pulls up the external voltage source to a predetermined times of voltage potential, and adds the pulled-up voltage to a correcting voltage for generating a target voltage directly without having to pass through a voltage regulator. In the present invention, if all elements are in ideal condition, the efficiency of the charge-pump circuitry of the present invention is up to 100%.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

Figure 1A:
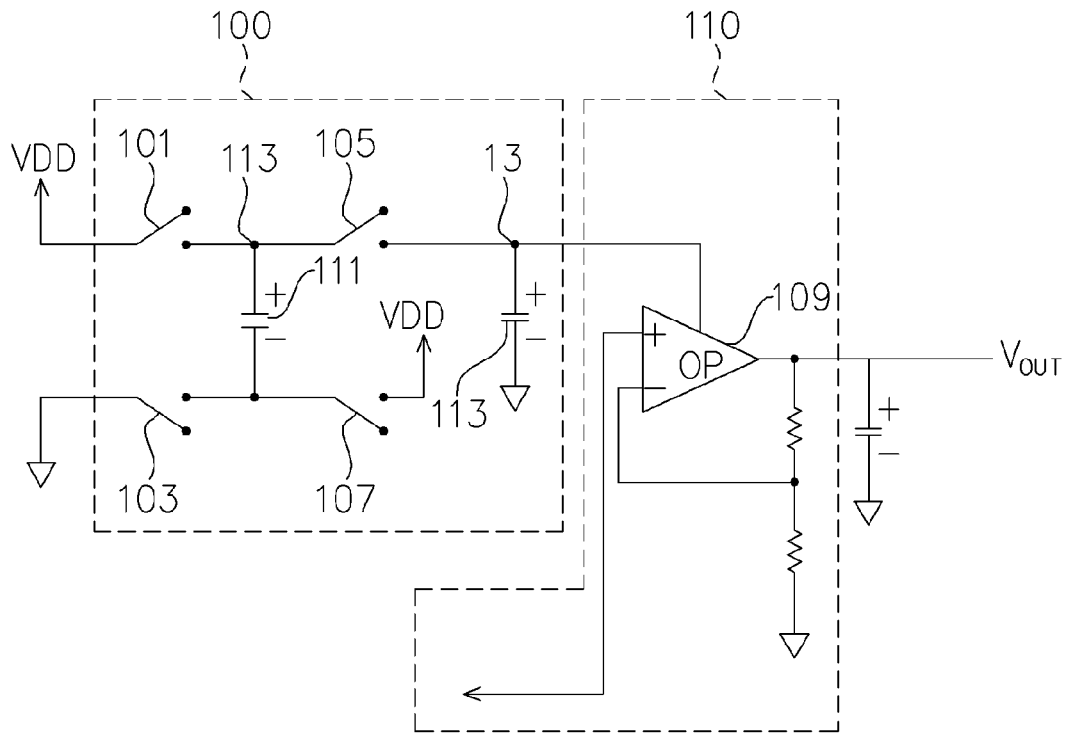
FIG. 1A is a schematic circuit diagram of a conventional regulated charge-pump circuitry.
Figure 1B:
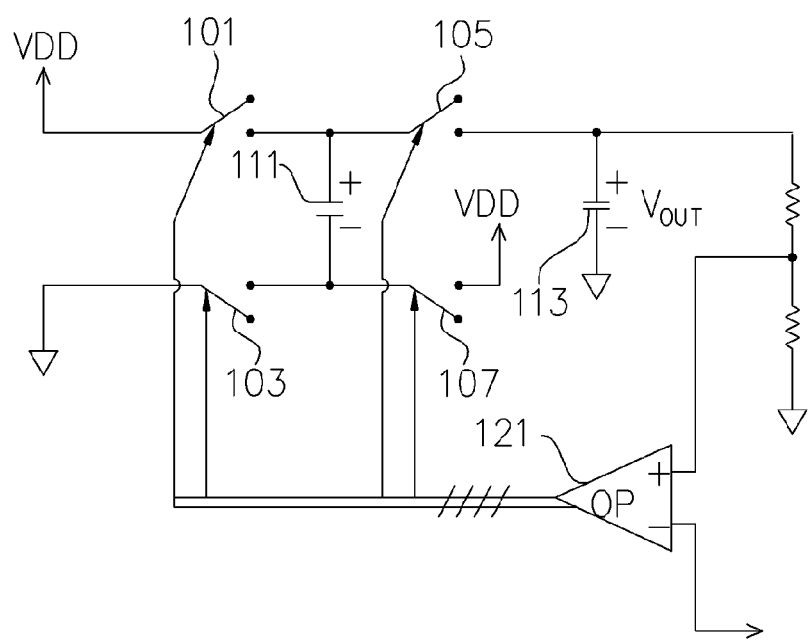
FIG. 1B is a schematic circuit diagram of another conventional regulated charge-pump circuitry.
Figure 2:
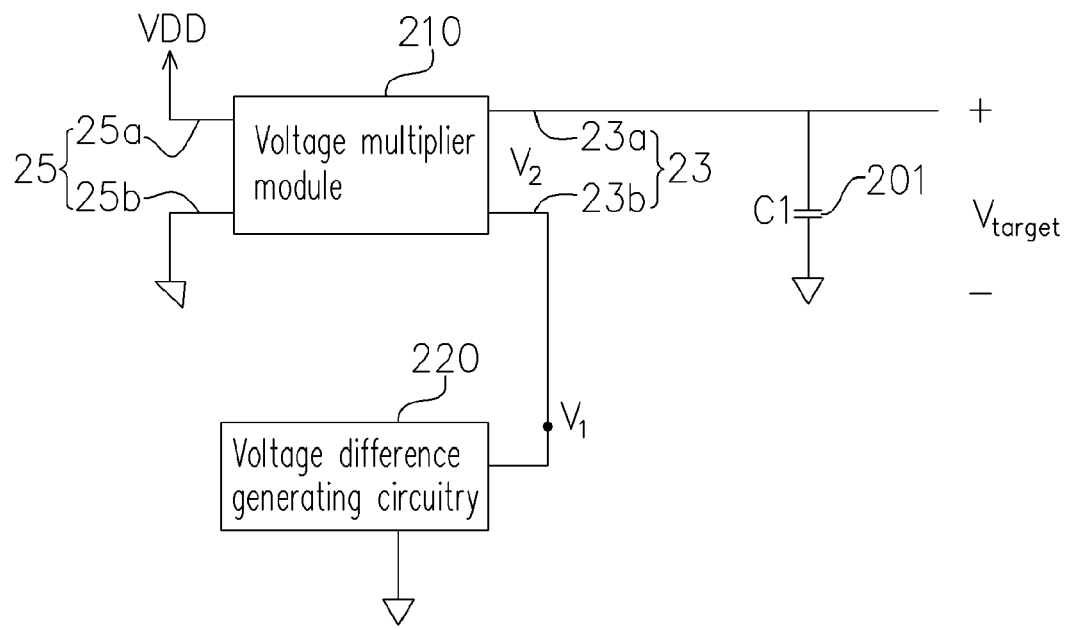
FIG. 2 is a schematic block diagram of a charge-pump circuitry according to a preferred embodiment of the present invention.

FIG. 2 is a schematic block diagram of a charge-pump circuitry according to a preferred embodiment of the present invention. The charge-pump circuitry of the present invention is composed of a voltage multiplier module 210 and a voltage difference generating circuitry 220. One terminal 25a in the input terminal 25 of the voltage multiplier module 210 receives an external voltage source VDD, and the other terminal is grounded. In addition, one terminal 23b in the output terminal 23 of the voltage multiplier module 210 electrically couples to the voltage difference generating circuitry 220, and the other terminal 23a electrically couples to a capacitor 201.

Referring to FIG. 2, the voltage multiplier module 210 generates a potential of the multiplied-voltage $V_2$ on an output terminal 23 according to the voltage potential of the external voltage source VDD, and the potential of the multiplied-voltage $V_2$ is a predetermined times of a potential difference between the external voltage source VDD and the ground voltage. In the present embodiment, the predetermined number of times is equal to 1. Moreover, the voltage difference generating circuitry 220 also generates a correcting voltage $V_1$, which is sent to the voltage multiplier module 210 through a terminal 23b of the output terminal 23. The voltage potential of the correcting voltage $V_1$ is the result voltage of subtracting the potential of the multiplied-voltage from a potential difference between the target voltage $V_{target}$ and the ground voltage.

It is expected in the charge-pump circuitry of the present invention that the voltage multiplier module can generate a potential of multiplied-voltage $V_2$ on the output terminal 23 according to a potential difference between the external voltage source VDD and the ground voltage, and a voltage potential of the correcting voltage $V_1$ generated by the voltage difference generating circuitry 220 is added to it, so as to finally obtain a desired target voltage $V_{target}$.

Figure 3:
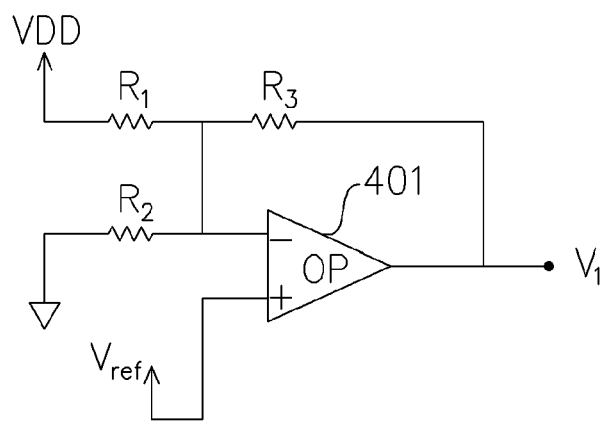
FIG. 3 is a schematic circuit diagram of a voltage difference generating circuitry according to a preferred embodiment of the present invention.

FIG. 3 is a schematic circuit diagram of a voltage difference generating circuitry according to a preferred embodiment of the present invention. Referring to FIG. 3, the main purpose of the voltage difference generating circuitry 220 is to generate a correcting voltage $V_1$, and the voltage potential of the correcting voltage $V_1$ is a potential difference between the target voltage $V_{target}$ and the multiplied-voltage $V_2$. It will be apparent to one of the ordinary skill in the art that such object also can be achieved by using other circuitries. An embodiment in FIG. 4 is used as an example of the present invention for explanation hereinafter. In FIG. 4, the operational amplifier is connected in a style of negative-feedback, wherein one terminal of the first resistor R1 receives the external voltage source VDD, and the other terminal of the first resistor R1 electrically couples to the negative signal input terminal of the operational amplifier 401. One terminal of the second resistor R2 electrically couples to the negative signal input terminal, and the other terminal is grounded. In addition, one terminal of the third resistor R3 electrically couples to the negative signal input terminal of the operational amplifier 401, the other terminal of the third resistor R3 electrically couples to an output terminal $V_1$ of the operational amplifier 401, and the output terminal $V_1$ electrically couples to the second input terminal 23 of the voltage multiplier module 210. In addition, the positive signal input terminal of the operational amplifier 401 receives a reference voltage $V_{ref}$ whose potential is constant.

Referring to FIG. 3, assuming that the operational amplifier 401 is in ideal condition, the output voltage at the output terminal $V_1$ of the operational amplifier 401 is:

$$V_1 = V_{ref}\frac{R1R2 + R2R3 + R1R3}{R1R2} - VDD\frac{R3}{R1} \quad (1)$$

Meanwhile, if the resistance of the first resistor R1 is designed to be equal to the resistance of the third resistor R3, the equation (1) becomes:

$$V_1 = V_{ref} \frac{2 \cdot R2 + R1}{R2} - VDD \qquad (2)$$

If the first resistor R1 and the second resistor R2 are modified as $V_{ref}(2\ R2+R1)/R2=V_{target}$, the equation (2) becomes:

$$V_1 = V_{targst} - VDD$$

Accordingly, the correcting voltage $V_1$ is obtained, and it is sent to the voltage multiplier module 210 in FIG. 2.

Figure 4A:
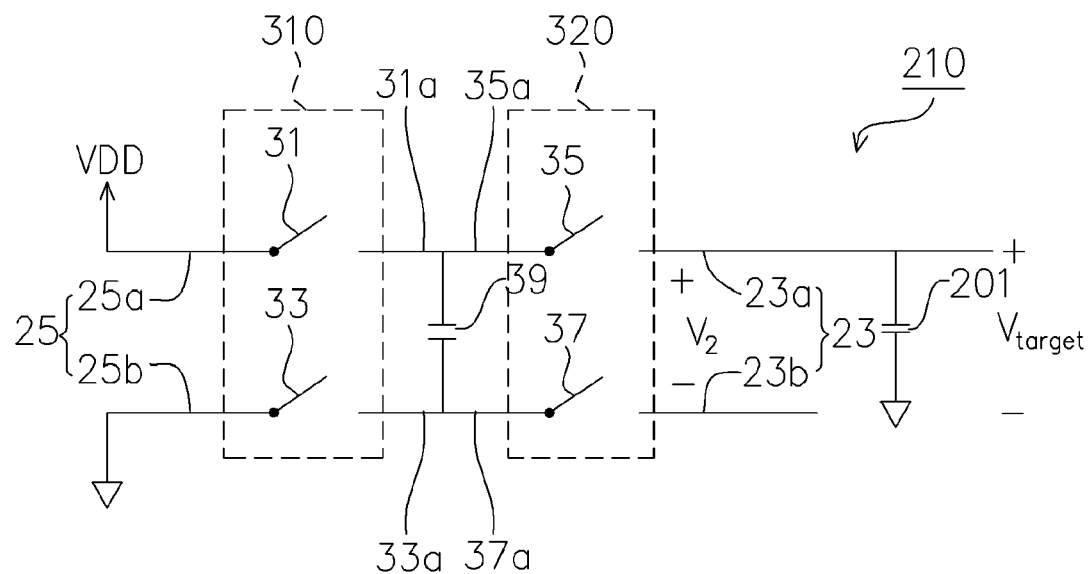
FIG. 4A is a schematic circuit diagram of a voltage multiplier module according to a preferred embodiment of the present invention.

FIG. 4A is a schematic circuit diagram of a voltage multiplier module according to a preferred embodiment of the present invention. Referring to FIG. 4A, the voltage multiplier module 210 comprises a first switch circuit 310 and a second switch circuit 320. A $1^{st}$ terminal of the first switch circuit 310 is one terminal 25a in the input terminal 25 of the voltage multiplier module 210, and a $2^{nd}$ terminal of the first switch circuit 310 is the other terminal 25b in the input terminal 25 of the voltage multiplier module 210. In addition, a $3^{rd}$ terminal 31a of the first switch circuit 310 electrically couples to a $5^{th}$ terminal 35a of the second switch circuit 320, a $4^{th}$ terminal 33a of the first switch circuit 310 electrically couples to the $6^{th}$ terminal 37a of the second switch circuit 320. A capacitor 39 electrically couples to a conjunction node of the $3^{rd}$ terminal 31a and $4^{th}$ terminal 33a of the first switch circuit 310.

To be more specific, the first switch circuit 310 is mainly composed of a first dual port switch 31 and a second dual port switch 33. One terminal of the first dual port switch 31 electrically couples to one terminal 25a in the input terminal 25 of the voltage multiplier module 210, and the other terminal of the first dual port switch 31 electrically couples to the $3^{rd}$ terminal 31a of the first switch circuit 310. In addition, one terminal of the second dual port switch 33 electrically couples to the other terminal 25b in the input terminal 25 of the voltage multiplier module 210, and the other terminal of the second dual port switch 33 electrically couples to the $4^{th}$ terminal 33a of the first switch circuit 310. The "turn-on" and "turn-off" cycles of the first dual port switch 31 is synchronized with the "turn-on" and "turn-off" cycles of the second dual port switch 33 and referred as a first clock cycle herein. During the duty cycle of the first clock cycle, the first dual port switch 31 and the second dual port switch 33 are turned on.

Referring to FIG. 4A, the second switch circuit 320 further comprises a $7^{th}$ terminal and an $8^{th}$ terminal. The $7^{th}$ terminal and the $8^{th}$ terminal of the second switch circuit 320 are the output terminals 23 of the voltage multiplier module 210. Similarly, the second switch circuit 320 is mainly composed of a third dual port switch 35 and a fourth dual port switch 37. One terminal of the third dual port switch 35 electrically couples to the $5^{th}$ terminal 35a of the second switch circuit 320, and the other terminal of the third dual port switch 35 electrically couples to one terminal 23a in the output terminal 23 of the voltage multiplier module 210. In addition, one terminal of the fourth dual port switch 37 electrically couples to the $6^{th}$ terminal 37a of the second switch circuit 320, and the other terminal of the fourth dual port switch 37 electrically couples to the other terminal 23b in the output terminal 23 of the voltage multiplier module 210.

Wherein, the "turn-on" and "turn-off" cycles of the third dual port switch 35 is referred as a second clock cycle, and the "turn-on" and "turn-off" cycles of the fourth dual port switch 37 is referred as a third clock cycle. During the duty cycle of the second clock cycle and the third clock cycle, the third dual port switch 35 and the fourth dual port switch 37 are turned on. In the present embodiment, the duty cycle of the third clock cycle leads the duty cycle of the second clock cycle a certain period of time, and the duty cycle of the second clock cycle and the third clock cycle is not overlapped with the duty cycle of the first clock cycle. In other words, when the first dual port switch 31 and the second dual port switch 33 are turned on, the third dual port switch 35 and the fourth dual port switch 37 are turned off. In addition, when the fourth dual port switch 37 is turned on, the first dual port switch 31 and the second dual port switch 33 are turned off, and the third dual port switch 35 is turned on only after the fourth dual port switch 37 has been turned on for a certain period of time and before the fourth dual port switch 37 is turned off.

Referring to FIG. 4A, when the first dual port switch 31 and the second dual port switch 33 are turned on, the external voltage source VDD continuously charges to the capacitor 39 until the voltage difference between both terminals of the capacitor 39 is equal to the voltage difference between the external voltage source VDD and the ground voltage. Meanwhile, the capacitor 39 operates like another external voltage source VDD, and the potential difference between both terminals of the capacitor 39 is defined as a multiplied-voltage $V_2$. After the charge of the capacitor 39 is completed, the first dual port switch 31 and the second dual port switch 33 are turned off, then the fourth dual port switch 37 is turned on first for connecting one terminal 23b of the output terminal 23, and the third dual port switch 35 is subsequently turned on, such that the voltage difference generating circuitry can charge the capacitor 201. After the charge of the capacitor 201 is completed, the voltage potential on its both terminals to the ground is $V_2+V_1$=VDD+$V_1$=VDD+$V_{target}$−VDD, which is equal to the target voltage $V_{target}$.

Figure 4B:
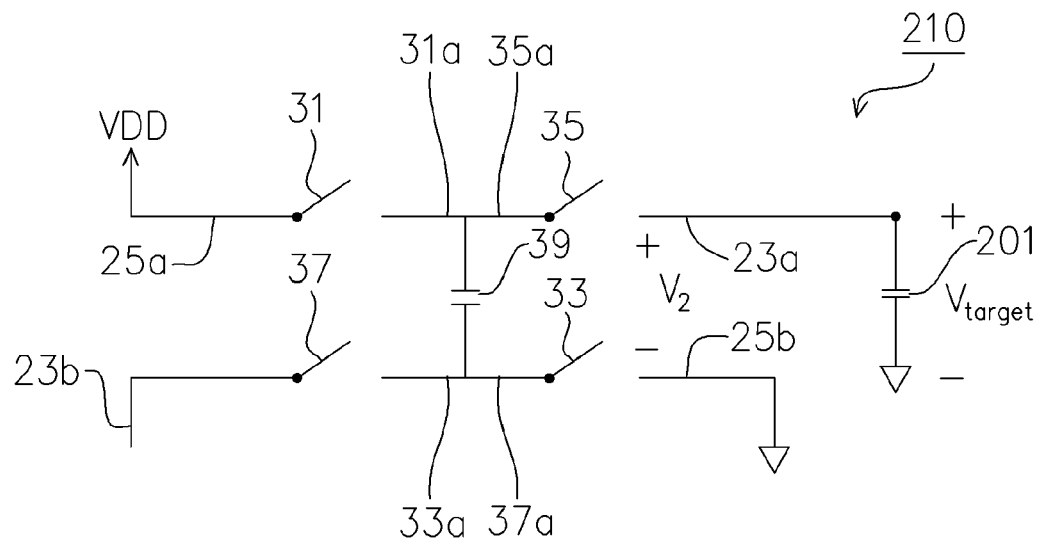
FIG. 4B is a schematic circuit diagram of another voltage multiplier module according to a preferred embodiment of the present invention.

FIG. 4B is a schematic circuit diagram of another voltage multiplier module according to a preferred embodiment of the present invention. Referring to FIG. 4B, the only difference in the present embodiment is that the second dual port switch 33 and the fourth dual port switch 37 are swapped with each other. To be more specific, one terminal of the fourth dual port switch 37 still electrically couples to one terminal 23b in the output terminal 23 of the voltage multiplier module 210, but the other terminal of the fourth dual port switch 37 electrically couples to the $4^{th}$ terminal 33a. In addition, one terminal of the dual port switch 33 still electrically couples to one terminal 25b in the input terminal 25 of the voltage multiplier module 210, but the other terminal of the second dual port switch 33 electrically couples to the $6^{th}$ terminal 37a. Besides this, all other connections and the operating principle of the entire voltage multiplier module 210 are the same as in the previous embodiment, thus its detail description is omitted herein.

The embodiments shown in FIGS. 4A and 4B above is a voltage multiplier module with a multiplier of 1. However, the voltage multiplier module of the present invention is not necessarily limited by it. The multiplier of the voltage multiplier module can be appropriately designed by the ordinary skill in the art according to different physical operating voltage requirements of different ICs.

In summary, the charge-pump circuitry of the present invention adds the multiplied-voltage to the correcting voltage for directly generating a desired target voltage without passing through the voltage regulator. Therefore, there is no electrical energy loss. If all the elements in the present invention are in ideal condition, the electrical energy used by it is up to 100%. Even in the physical environment, the efficiency of the present invention is still very high.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

The invention claimed is:

1. A charge-pump circuitry, receiving an external voltage source to generate a target voltage, comprising:
   a voltage multiplier module, comprising an input terminal and an output terminal, wherein the output terminal comprises a first terminal and a second terminal, the input terminal receives the external voltage source, the voltage multiplier module generates a multiplied-voltage on the first terminal and the second terminal according to the external voltage source, and the multiplied-voltage is a predetermined times of a voltage potential of the external voltage source;
   a voltage difference generating circuitry for generating a correcting voltage, wherein an output terminal of the voltage difference generating circuitry electrically couples to the second terminal in the output terminal of the voltage multiplier module, and a voltage potential of the correcting voltage is a potential difference between the target voltage and the multiplied-voltage; and
   a first capacitor, wherein one terminal of the first capacitor electrically couples to the first terminal in the output terminal of the voltage multiplier module, and the other terminal is grounded.

2. The charge-pump circuitry of claim 1, wherein the voltage difference generating circuitry comprises:
   an operational amplifier, comprising an negative signal input terminal, a positive signal input terminal, and an output terminal, wherein the positive signal input terminal receives a reference voltage, and the output terminal electrically couples to the second input terminal;
   a first resistor, wherein one terminal of the first resistor electrically couples to the negative signal input terminal, and the other terminal receives the external voltage source;
   a second resistor, wherein one terminal of the second resistor electrically couples to the negative signal input terminal, and the other terminal is grounded; and
   a third resistor, wherein one terminal of the third resistor electrically couples to the negative signal input terminal, and the other terminal electrically couples to the output terminal.

3. The charge-pump circuitry of claim 1, wherein the voltage multiplier module comprises:
   a first switch circuit, comprising a $1^{st}$ terminal, a $2^{nd}$ terminal, a $3^{rd}$ terminal, and a $4^{th}$ terminal, wherein the $1^{st}$ terminal receives the external voltage source, and the $2^{nd}$ terminal is grounded;
   a second capacitor, wherein one terminal of the second capacitor electrically couples to the $3^{rd}$ terminal, and the other terminal electrically couples to the $4^{th}$ terminal; and
   a second switch circuit, comprising a $5^{th}$ terminal, a $6^{th}$ terminal, a $7^{th}$ terminal, and an $8^{th}$ terminal, wherein the $5^{th}$ terminal electrically couples to the $3^{rd}$ terminal, the $6^{th}$ terminal electrically couples to the $4^{th}$ terminal, and the $7^{th}$ terminal and the $8^{th}$ terminal are the output terminal;
   wherein, the first switch circuit determines whether to have the external voltage source pass through to charge the second capacitor, and the second switch circuit determines whether to have the target voltage pass through to charge the first capacitor.

4. The charge-pump circuitry of claim 3, wherein the voltage potential of the target voltage is a summation of a potential stored in the second capacitor and the voltage potential of the correcting voltage.

5. The charge-pump circuitry of claim 4, wherein the first switch circuit comprises:
   a first dual port switch, wherein one terminal of the first dual port switch is the $1^{st}$ terminal, and the other terminal of the first dual port switch is the $3^{rd}$ terminal; and
   a second dual port switch, wherein one terminal of the second dual port switch is the $2^{nd}$ terminal, the other terminal of the second dual port switch is the $4^{th}$ terminal, and the first dual port switch and the second dual port switch determine whether to have the external voltage source pass through to charge the second capacitor.

6. The charge-pump circuitry of claim 5, wherein the second switch circuit comprises:
   a third dual port switch, wherein one terminal of the third dual port switch is the $5^{th}$ terminal, and the other terminal of the third dual port switch is the $7^{th}$ terminal; and
   a fourth dual port switch, wherein one terminal of the fourth dual port switch is the $6^{th}$ terminal, the other terminal of the fourth dual port switch is the $8^{th}$ terminal, and the third dual port switch and the fourth dual port switch determine whether to have the target voltage source pass through to charge the first capacitor.

7. The charge-pump circuitry of claim 6, wherein a "turn-on" and "turn-off" cycle of the first dual port switch and the second dual port switch is referred as a first clock cycle, a "turn-on" and "turn-off" cycle of the third dual port switch is referred as a second clock cycle, a "turn-on" and "turn-off" cycle of the fourth dual port switch is referred as a third clock cycle, and during a duty cycle of the first clock cycle, the second clock cycle, and the third clock cycle, the first dual port switch, the second dual port switch, the third dual port switch, and the fourth dual port switch are turned on.

8. The charge-pump circuitry of claim 7, wherein the duty cycle of the first clock cycle is not overlapped with the duty cycle of the second clock cycle, and the duty cycle of the first clock cycle is not overlapped with the duty cycle of the third clock cycle, neither.

9. The charge-pump circuitry of claim 8, wherein the duty cycle of the third clock cycle leads the duty cycle of the second clock cycle a certain period of time.

10. The charge-pump circuitry of claim 4, wherein the first switch circuit comprises:
   a first dual port switch, wherein one terminal of the first dual port switch is the $1^{st}$ terminal, and the other terminal of the first dual port switch is the $3^{rd}$ terminal; and
   a second dual port switch, wherein one terminal of the second dual port switch is the $2^{nd}$ terminal, the other terminal of the second dual port switch is the $6^{th}$ terminal, and the first dual port switch and the second dual port switch determine whether to have the external voltage source pass through to charge the second capacitor.

11. The charge-pump circuitry of claim 10, wherein the second switch circuit comprises:
   a third dual port switch, wherein one terminal of the third dual port switch is the $5^{th}$ terminal, and the other terminal of the third dual port switch is the $7^{th}$ terminal; and
   a fourth dual port switch, wherein one terminal of the fourth dual port switch is the $4^{th}$ terminal, the other terminal of the fourth dual port switch is the $8^{th}$ terminal, and the third dual port switch and the fourth dual port switch determine whether to have the target voltage source pass through to charge the first capacitor.

12. The charge-pump circuitry of claim 11, wherein a "turn-on" and "turn-off" cycle of the first dual port switch and the second dual port switch is referred as a first clock cycle, a "turn-on" and "turn-off" cycle of the third dual port switch is referred as a second clock cycle, a "turn-on" and "turn-off" cycle of the fourth dual port switch is referred as a third clock cycle, and during a duty cycle of the first clock cycle, the second clock cycle, and the third clock cycle, the first dual port switch, the second dual port switch, the third dual port switch, and the fourth dual port switch are turned on.

13. The charge-pump circuitry of claim 12, wherein the duty cycle of the first clock cycle is not overlapped with the duty cycle of the second clock cycle, and the duty cycle of the first clock cycle is not overlapped with the duty cycle of the third clock cycle, neither.

14. The charge-pump circuitry of claim 13, wherein the duty cycle of the second clock cycle leads the duty cycle of the third clock cycle a certain period of time.

* * * * *